(12) United States Patent
Nakatani et al.

(10) Patent No.: US 12,516,214 B2
(45) Date of Patent: Jan. 6, 2026

(54) COLORING COMPOSITION, COLORING METHOD, AND PIGMENT DISPERSION

(71) Applicant: SEIKO EPSON CORPORATION, Tokyo (JP)

(72) Inventors: Mitsunobu Nakatani, Shiojiri (JP); Kei Hiruma, Chino (JP); Tomoyuki Ushiyama, Chino (JP); Kenta Tsukada, Shiojiri (JP)

(73) Assignee: SEIKO EPSON CORPORATION (JP)

( * ) Notice: Subject to any disclaimer, the term of this patent is extended or adjusted under 35 U.S.C. 154(b) by 342 days.

(21) Appl. No.: 18/115,028

(22) Filed: Feb. 28, 2023

(65) Prior Publication Data
US 2023/0279255 A1    Sep. 7, 2023

(30) Foreign Application Priority Data
Mar. 1, 2022  (JP) .................... 2022-030672

(51) Int. Cl.
| | | |
|---|---|---|
| *C09D 17/00* | (2006.01) | |
| *C08K 3/08* | (2006.01) | |
| *C08K 9/04* | (2006.01) | |
| *C09C 3/08* | (2006.01) | |
| *C09D 7/20* | (2018.01) | |

(52) U.S. Cl.
CPC ............. *C09D 17/006* (2013.01); *C08K 3/08* (2013.01); *C08K 9/04* (2013.01); *C09C 3/08* (2013.01); *C09D 7/20* (2018.01); *C08K 2003/0812* (2013.01); *C08K 2201/005* (2013.01)

(58) Field of Classification Search
CPC ...... C09D 11/322; C09D 7/62; C09D 17/006; C09D 7/20; C09D 17/00; C08K 2003/0812; C08K 9/04; C08K 2201/005; C09C 3/08; C09C 3/12
See application file for complete search history.

(56) References Cited

U.S. PATENT DOCUMENTS

| | | |
|---|---|---|
| 6,398,861 B1 | 6/2002 | Knox |
| 2007/0051272 A1 | 3/2007 | Wheeler |
| 2010/0251929 A1 | 10/2010 | Kagata et al. |
| 2014/0037918 A1 | 2/2014 | Kuribayashi et al. |
| 2015/0210859 A1 | 7/2015 | Denda et al. |
| 2018/0371281 A1 | 12/2018 | Takiguchi |
| 2022/0243080 A1 | 8/2022 | Kida et al. |

FOREIGN PATENT DOCUMENTS

| | | | | |
|---|---|---|---|---|
| CA | 2831368 A1 | * | 10/2012 | ............ B41J 2/2107 |
| CA | 3145553 A1 | * | 1/2021 | ............ B05D 5/067 |
| CN | 103571272 A | | 2/2014 | |
| CN | 114806284 A | | 7/2022 | |
| JP | 2001-502375 A | | 2/2001 | |
| JP | 2008-201991 A | | 9/2008 | |
| JP | 2011-140609 A | | 7/2011 | |
| JP | 2013-064053 A | | 4/2013 | |
| JP | 2013-227454 A | | 11/2013 | |
| JP | 2015-140359 A | | 8/2015 | |
| JP | 2019-006850 A | | 1/2019 | |

OTHER PUBLICATIONS

Translation of TW 1662152. (Year: 2019).*
Yan Meifa et al, "Printing and Packaging Materials", Cultural Development Press, Textbook for Undergraduate Majoring in Printing Engineering for General Higher Education, Oct. 2017, pp. 293-295, with partial English translation (13 Pages).
Li Fengsheng, et al. "Micro-Nano Powder Post-Processing Technology and Application", National Defense Industry Press, Nanomaterial Modification Technology Series, Sep. 2005, p. 412, with partial English translation (9 Pages).

* cited by examiner

*Primary Examiner* — Zakiya W Bates
(74) *Attorney, Agent, or Firm* — Harness, Dickey & Pierce, P.L.C.

(57) ABSTRACT

An aqueous coloring composition contains a metal pigment and water. The metal pigment is metal particles having a surface treated with at least one surface treatment agent, and the surface treatment agent is at least one compound represented by general formula (1) $(A^1\text{-}R^1\text{—})P(Q)(OH)_2$ or (2) $(A^2\text{-}R^2\text{—O—})_a P(O)(OH)_{3-a}$. The volume-average particle diameter D50 of the metal pigment is 9 μm or less.

14 Claims, No Drawings

COLORING COMPOSITION, COLORING METHOD, AND PIGMENT DISPERSION

The present application is based on, and claims priority from JP Application Serial Number 2022-030672, filed Mar. 1, 2022, the disclosure of which is hereby incorporated by reference herein in its entirety.

BACKGROUND

1. Technical Field

The present disclosure relates to a coloring composition, a coloring method, and a pigment dispersion.

2. Related Art

In the related art, inks, paints, and other compositions containing a metal pigment, such as aluminum, have been developed for the production of articles having a metallic luster feel. In recent years, the development of compositions has focused more on water-based compositions, containing water as their primary solvent, than on non-water-based compositions, in which the primary solvent is an organic solvent, for reasons such as global ecological issues and the ease of handling.

For example, JP-A-2015-140359 discloses an aqueous metal ink made with an aluminum pigment. The surface of the aluminum pigment disclosed in JP-A-2015-140359 has been treated with a fluorine treatment agent so that the ink will lose little metallic luster in the water.

Metal pigments in aqueous metal inks, however, are still insufficiently water resistant. They are oxidized in the water-based medium over time, and the resulting changes in surface condition impair their dispersion stability and glittering feel.

Treating the surface of a metal pigment can also cause the metal pigment to be oxidized during the treatment. When this occurs, the metal pigment loses its luster and aggregates easily.

Overall, there is a need for a coloring composition in which a metal pigment is superior in water resistance, has good dispersion stability, and easy to redisperse even when it aggregates.

SUMMARY

According to an aspect of the present disclosure, a coloring composition is an aqueous coloring composition containing a metal pigment and water, wherein the metal pigment is metal particles having a surface treated with at least one surface treatment agent; the surface treatment agent is at least one compound represented by general formula (1) or (2); and a volume-average particle diameter D50 of the metal pigment is 9 μm or less:

$(A^1\text{-}R^1\text{---})P(O)(OH)_2$     (1)

$(A^2\text{-}R^2\text{---}O\text{---})_aP(O)(OH)_{3-a}$     (2)

where $A^1$ and $A^2$ each independently represent a hydrogen atom or a group selected from a carboxyl group, a hydroxyl group, an amino group, and an oxyalkylene-containing group, $R^1$ and $R^2$ each independently represent a hydrocarbon group having 12 or more carbon atoms, and a represents an integer of 1 or 2.

According to an aspect of the present disclosure, a coloring method includes attaching the above coloring composition to a substrate.

According to an aspect of the present disclosure, a pigment dispersion is a pigment dispersion for use in preparing the above coloring composition, the pigment dispersion containing the metal pigment.

DESCRIPTION OF EXEMPLARY EMBODIMENTS

Embodiments of the present disclosure will now be described. The following embodiments are descriptions of examples of the disclosure. The disclosure is never limited to these embodiments and includes variations implemented within the gist of the disclosure. Not all the elements, features, or configurations described below are essential to the disclosure.

As used herein, the term "(meth)acrylic" refers to acrylic or methacrylic, and "(meth)acrylate" refers to an acrylate or methacrylate. A "coloring composition" may be referred to as a "composition," and a coloring composition may be referred to as an "ink composition" or "ink."

1. Coloring Composition

A coloring composition according to an embodiment contains a metal pigment and water. A coloring composition is a composition used to color a substrate by being attached to the substrate. The composition can be of any kind, but examples include ink and paint.

1.1. Metal Pigment

The metal pigment is metal particles having a surface treated with at least one surface treatment agent. A more specific form of the metal pigment is a combination of metal particles and surface treatment agent(s) adhering to their surface, for example by chemical bonding or physical adsorption.

1.1.1. Metal Particles

At least part of the visible exterior of the metal particles is made of a metallic material. For example, the entire metallic particles or a near-surface portion of the particles is made of a metallic material. The metal particles have a function to impart a metallic luster to the colored article produced using the coloring composition.

The metal particles only need to be made of a metallic material at least in a region including a near-surface portion. For example, the entire metal particles may be made of a metallic material, or the metal particles may have a core made of a nonmetallic material and a coating covering the core and made of a metallic material. The metal particles may have, for example, a passivation film like an oxide coating on their surface. While the water resistance, metallic luster feel, and other issues have been encountered even with such metal particles, the coloring composition according to this embodiment delivers advantages such as excellent water resistance and an excellent metallic luster feel.

The metallic material that forms (at least part of) the metal particles can be, for example, a pure metal or an alloy. Examples include aluminum, silver, gold, platinum, nickel, chromium, tin, zinc, indium, titanium, iron, copper, and alloys containing at least one of these metals. Of these, it is preferred that the metal particles be particles of aluminum or an aluminum alloy, more preferably particles of aluminum. One reason for the preference of aluminum and aluminum alloys is that they have a low relative density compared with metals such as iron. This ensures the metal pigment dispersed in the ink will settle down very slowly. Defects such as density irregularities, therefore, will be reduced, and the shelf life of the composition tends to be longer. Using a metal pigment made with metal particles made of aluminum or an aluminum alloy also helps enhance the luster and classy feels of the colored article produced using the coloring composition with a limited increase in production costs.

Aluminum and aluminum alloys basically have an outstanding luster feel among metallic materials, but an attempt to make a composition with particles of such a material can be disadvantageous. First, the storage stability (water resistance) of the composition tends to be low. When the composition is used as an ink jet composition, furthermore, there will often be disadvantages such as reduced ejection stability caused by a viscosity increase as a result of gelation. The surface treatment with particular surface treatment agent(s) according to this embodiment, described later herein, helps address such disadvantages even when the metal pigment is made with metal particles made of aluminum or an aluminum alloy. In other words, using metal particles made of aluminum or an aluminum alloy makes the advantages of the composition according to this embodiment more significant.

The metal particles may be in any shape, such as spheres, spindles, or needles, but preferably are flakes. When the composition is applied to an object, metal particles in flake shape tend to be positioned with their primary surface parallel with the surface profile of the object. This ensures the luster feel, for example, of the metallic material forming (at least part of) the metal particles will be carried over into the resulting colored article more effectively, thereby helping impart excellent luster and classy feels to the colored article. Using flake-shaped metal particles also tends to help make the colored article superior in abrasion resistance, too.

As used herein, the term "flakes" refers to a shape in which the particles have a larger area when observed at a predetermined angle (first angle of observation), for example in plan view, than when observed at an angle perpendicular to the first angle of observation, for example as with flat or curved plates. It is particularly preferred that the ratio $S_1/S_0$ be 2 or greater, more preferably 5 or greater, even more preferably 8 or greater, where $S_1$ is the area [$\mu m^2$] of the particles observed in the direction in which the particles have their maximum projected area (first direction of observation), or the area in plan view, and $S_0$ is the area [$m^2$] of the particles observed in the direction that is perpendicular to the first direction of observation and in which the particles have a larger projected area than in any other perpendicular direction. More preferably, the ratio $S_1/S_0$ is 10 or greater, even more preferably 20 or greater. Still more preferably, $S_1/S_0$ is 30 or greater. There is no particular upper limit, but preferably $S_1/S_0$ is 1000 or less, more preferably 500 or less, even more preferably 100 or less. Still more preferably, $S_1/S_0$ is 80 or less.

This ratio can be, for example, a mean determined by observing any 50 particles and averaging calculated ratios. The observation can be made using, for example, an electronic microscope or atomic force microscope. Alternatively, the volume-average particle diameter (D50), described later herein, and the average thickness may be used. That is, the volume-average particle diameter (D50) divided by the average thickness, both in the same unit, may be in the above ranges.

When the metal particles are flakes, it is preferred that the average thickness of the metal particles be 5 nm or more and 90 nm or less. Although there is no particular lower limit, it is more preferred that the average thickness of the metal particles be 10 nm or more, even more preferably 15 nm or more. When the metal particles are flakes, furthermore, it is more preferred that the average thickness of the metal particles be 70 nm or less, although there is no particular upper limit. Even more preferably, the average thickness of the metal particles is 50 nm or less, in particular 30 nm or less, in particular 20 nm or less, in particular 15 nm or less.

When the metal particles are flakes having an average thickness of 5 nm or more and 90 nm or less, preferably an average thickness in the above ranges, the advantages of using flake-shaped particles as described above become more significant.

The average thickness of the metal particles can be measured using an atomic force microscope (AFMV) in the same way as that of the metal pigment, described later herein. For example, the thickness of any 50 metal particles is measured by atomic force microscopy, and the measurements are averaged. That is, the average thickness is an arithmetic mean thickness.

As for the volume-average diameter (D50) of the metal particles, preferred ranges and how to measure it can be the same as those for the volume-average particle diameter (D50) of the metal pigment, described later herein. That is, the volume-average diameter (D50) of the metal particles is that measured as a volume-average diameter D50 using a laser diffraction/scattering particle size distribution analyzer.

It is not critical how the metal particles are produced, but when they are particles of aluminum, it is preferred that they be obtained by forming a film of aluminum by vapor-phase film formation and then crushing it. This production method helps reduce variations in characteristics between the particles. The use of this method, furthermore, is suitable even for the production of relatively thin metal particles.

When such a method is used, an example of a suitable way to produce the metal particles is to form a film of aluminum on a base material. The base material can be, for example, a plastic film, such as a film of polyethylene terephthalate. The base material may have a release agent layer on the side on which the film is to be formed.

The film is crushed preferably by sonicating it in a liquid. This is an easy way to obtain metal particles having a diameter as described above and also helps reduce the occurrence of variations in size, shape, and characteristics between the metal particles.

When the film is crushed by such a method, examples of suitable liquids include alcohols, hydrocarbon compounds, ether compounds, and polar compounds, such as propylene carbonate, γ-butyrolactone, N-methyl-2-pyrrolidone, N,N-dimethylformamide, N,N-dimethylacetamide, dimethylsulfoxide, cyclohexanone, and acetonitrile. Using such a liquid helps control unwanted oxidation, for example, of the metal particles and also helps dramatically increase productivity in the production of the metal particles. These liquids also help reduce variations in size, shape, and characteristics between the particles to sufficiently small levels.

1.1.2. Surface Treatment Agent(s)

The surface treatment agent with which the surface of the metal particles is treated is at least one compound represented by general formula (1) or (2).

(1)

(2)

(In the formulae, $A^1$ and $A^2$ each independently represent a hydrogen atom or a group selected from a carboxyl group, a hydroxyl group, an amino group, and an oxyalkylene-containing group, $R^1$ and $R^2$ each independently represent a hydrocarbon group having 12 or more carbon atoms, and a represents an integer of 1 or 2.)

A compound represented by general formula (1) (phosphonic acid with a substituted or unsubstituted alkyl) is a compound derived from phosphonic acid by replacing a hydrogen atom with an ($A^1$-$R^1$—) group. Such a compound tends to be distributed uniformly on the surface of the metal particles by virtue of little steric hindrance by its alkyl moiety, helping impart good dispersion stability and good luster to the metal pigment.

A compound represented by general formula (2) is a compound derived from phosphoric acid by esterifying one or two of its three hydroxyl groups with a substituted or unsubstituted alkyl group.

A compound represented by general formula (2) is a diester having substituted or unsubstituted alkyls when a is 1, and is a monoester having a substituted or unsubstituted alkyl when a is 2. When a is 1 (diester), the compound represented by general formula (2) tends to be more effective in keeping water away from the surface of the metal particles by virtue of steric hindrance by the two substituted or unsubstituted alkyl moieties and, therefore, tends to make the metal pigment better at water resistance.

In the above formulae, $R^1$ and $R^2$ are divalent hydrocarbon groups having a carbon backbone with 12 or more carbon atoms. The arrangement of carbons in these divalent hydrocarbon groups may be linear-chain, branched, or cyclic. The divalent hydrocarbon groups may include a saturated or unsaturated bond, and the positions of the two binding sites in these divalent hydrocarbon groups are not critical.

$R^1$ and $R^2$ may be substituted with substituents $A^1$ and $A^2$, respectively. When $A^1$ and $A^2$ are hydrogen atoms, $R^1$ and $R^2$ are unsubstituted hydrocarbon groups.

It should be noted that although $R^1$ and $R^2$ are divalent hydrocarbon groups, they are also monovalent hydrocarbon groups when $A^1$ and $A^2$ are hydrogen atoms.

In the above formulae, furthermore, $A^1$ and $A^2$ can be in any positions in $R^1$ and $R^2$, respectively. For example, $A^1$ and $A^2$ in the formulae may be at ends of $R^1$ and $R^2$, respectively, or may be in other positions. Likewise, $R^1$ can be bound to the P at any position, and $R^2$ can be bound to the O at any position. Preferably, however, $A^1$ and $A^2$ are bound to the farthest carbon atoms in $R^1$ and $R^2$, respectively, from the P and O, respectively. In that case the metal pigment tends to be superior in dispersion stability.

Examples of divalent hydrocarbon groups having a carbon backbone with 12 or more carbon atoms include divalent saturated hydrocarbon groups, which have no carbon-carbon double or triple bond, and divalent unsaturated hydrocarbon groups, which have a carbon-carbon double or triple bond. A divalent hydrocarbon group may be, for example, an aromatic hydrocarbon group, which has an aromatic ring structure in its carbon backbone, or a chain-shaped or cyclic aliphatic hydrocarbon group. A chain-shaped aliphatic hydrocarbon group is particularly preferred because it leads to, for example, better dispersion stability. An aliphatic hydrocarbon group having a chain-shaped backbone may be a branched-chain or linear-chain one. A linear-chain aliphatic hydrocarbon group is preferred because it leads to, for example, better dispersion stability, better ejection stability, and better luster.

Each of $A^1$ and $A^2$ is independently a hydrogen atom or a group selected from a carboxyl group, a hydroxyl group, an amino group, and an oxyalkylene-containing group. An oxyalkylene-containing group is a group having an oxyalkylene structure. An oxyalkylene structure is also referred to as an alkylene oxide structure.

An oxyalkylene-containing group has one or more alkylene oxide units and may have two or more. In particular, an oxyalkylene-containing group may have a structure formed by multiple repeated alkylene oxide units. Preferably, the number of repetitions of the alkylene oxide unit is ten or less, more preferably four or less. As for the lower limit, the number of repetitions is one or more, preferably two or more, more preferably three or more. Preferably, the number of carbon atoms in the alkylene in the alkylene oxide unit is one or more and four or less.

For a compound represented by general formula (1) and that represented by general formula (2), it is preferred that each of $R^1$ and $R^2$ in the formulae be independently a divalent hydrocarbon group having 14 to 32 carbon atoms, more preferably a divalent hydrocarbon group having 15 to 30 carbon atoms, even more preferably a divalent hydrocarbon group having 16 to 22 carbon atoms, in particular a divalent hydrocarbon group having 16 to 20 carbon atoms. In such a case the coloring composition is better at dispersion stability and water resistance, and any ingredients settling down can be redispersed easily.

Preferably, $R^1$ and $R^2$ in general formulae (1) and (2), respectively, have equal numbers of carbon atoms, more preferably are hydrocarbon groups having the same structure. In such a case the surface treatment agents are more apt to adhere uniformly to the surface of the metal particles, and this helps achieve a better balance between the improvement of, for example, water resistance and a luster feel.

Specific examples of compounds represented by general formula (1) include dodecylphosphonic acid (lauryl phosphonic acid), tetradecylphosphonic acid (myristyl phosphonic acid), hexadecylphosphonic acid (cetyl phosphonic acid), and octadecylphosphonic acid (stearyl phosphonic acid). Preferably, one or more selected from these are used. It is more preferred to use one or more selected from hexadecylphosphonic acid (cetyl phosphonic acid) and octadecylphosphonic acid (stearyl phosphonic acid), even more preferably octadecylphosphonic acid (stearyl phosphonic acid).

Specific examples of compounds represented by general formula (2) in monoester form include monooctyl phosphate, monolauryl phosphate, monoisotridecyl phosphate, and monostearyl phosphate. Preferably, one or more selected from these are used. It is more preferred to use one or more selected from monoisotridecyl phosphate and monostearyl phosphate, even more preferably monostearyl phosphate.

Specific examples of compounds represented by general formula (2) in diester form include dioctyl phosphate, dilauryl phosphate, diisotridecyl phosphate, and distearyl phosphate. Preferably, one or more selected from these are used. It is more preferred to use one or more selected from diisotridecyl phosphate and distearyl phosphate, even more preferably distearyl phosphate.

Compounds represented by formula (2) in which a is 2, or phosphoric acid diesters, introduce more alkyl groups than monoesters onto the surface of the metal particles by virtue of having two alkyl groups. The resulting increased hydrophobicity of the pigment surface helps enhance the water resistance, for example, of the pigment.

More preferably, the surface treatment agent includes either a compound represented by formula (1) or a compound represented by formula (2) in which a is represented by 2. In such a case the surface treatment agent is more apt to adhere uniformly to the surface of the metal particles, and this helps achieve a better balance between the improvement of, for example, water resistance and a luster feel.

Preferably, the amount of the surface treatment agent is 0.5% by mass or more and 60% by mass or less, preferably 1% by mass or more and 50% by mass or less, more preferably 5% by mass or more and 40% by mass or less, even more preferably 20% by mass or more and 40% by mass or less, with the total mass of the metal particles being 100% by mass. With such a percentage of surface treatment agent(s), not only is water resistance better, but also any ingredients settling down can be redispersed more easily.

The mass of the surface treatment agent is that of the surface treatment agent contained in the coloring composition. When the surface treatment agent contained in the coloring composition is adhering to the metal particles, the mass of the surface treatment agent is also that of the surface treatment agent adhering to the metal particles.

The coloring composition according to this embodiment may contain surface treatment agents other than those described above unless they impair the advantages of this aspect of the present disclosure. An example of such a surface treatment agent is a fluorine compound. Examples of preferred fluorine compounds include compounds composed of elements including fluorine and one or more selected from phosphorus, sulfur, and nitrogen. Specific examples include fluorinated phosphonic acid, fluorinated carboxylic acid, fluorinated sulfonic acid, and their salts.

As stated, the metal particles may be produced by forming a film of a metal by vapor-phase film formation and crushing it in a liquid. The surface treatment of the metal particles with the surface treatment agent may be carried out by, for example, mixing the surface treatment agent into the liquid beforehand.

1.1.3. Volume-Average Particle Diameter

The volume-average particle diameter D50 of the metal pigment in the coloring composition is 9 µm or less.

Suitable particle diameters of the metal pigment, however, vary according to the purpose of use of the coloring composition. For example, when the coloring composition is used as paint, it is preferred that the volume-average particle diameter D50 of the metal pigment, or the metal particles treated with the surface treatment agent, be 8.5 µm or less, more preferably 3 µm or more and 8 µm or less, even more preferably 6 µm or more and 8 µm or less. When the coloring composition is used as paint, a metal pigment having such a particle diameter has good water resistance and gives a colored article having a better metallic luster by virtue of its large particle diameter. Any ingredients settling down in the paint, furthermore, can be redispersed easily, even though ingredients are apt to settle down because of the large particle diameter of the metal pigment.

To take another example, when the coloring composition is used as an ink jet ink, it is preferred that the volume-average particle diameter D50 of the metal pigment, or the metal particles treated with the surface treatment agent, be 2 µm or less, more preferably 1 µm or less, even more preferably 200 nm or more and 800 nm or less, in particular 300 nm or more and 500 nm or less.

When the coloring composition is used as an ink jet ink, making the particle diameter of the metal pigment within these ranges helps further reduce the clogging of nozzles during ink jet ejection. With a particle diameter in these ranges, furthermore, the metal pigment has good water resistance despite its large specific surface area, and any ingredients settling down can be redispersed easily.

The volume-average particle diameter D50 of the metal pigment can be measured in the same way as described in the Metal Particles section.

1.2. Water

The coloring composition according to this embodiment is an aqueous composition. In other words, the coloring composition contains water. Herein, an aqueous composition is defined as a composition the water content of which is 20% by mass or more of the liquid medium component in the composition. Preferably, the water content in relation to the liquid medium component is 30% by mass or more and 100% by mass or less, more preferably 40% by mass or more and 90% by mass or less, even more preferably 50% by mass or more and 80% by mass or less. A liquid medium is a solvent ingredient, such as water or an organic solvent.

Preferably, the water content in relation to the coloring composition, the amount of which is 100% by mass, is 20% by mass or more, more preferably 30% by mass or more and 99% by mass or less, even more preferably 40% by mass or more and 90% by mass or less, still more preferably 50% by mass or more and 80% by mass or less.

Preferably, the water is purified water or ultrapure water, such as deionized water, ultrafiltered water, reverse osmosis water, or distilled water. A sterilized form of these kinds of water, for example sterilized by ultraviolet irradiation or adding hydrogen peroxide, is particularly preferred because it helps control the development of molds and bacteria for a prolonged period of time.

1.3. Extra Ingredients

The coloring composition may contain substances as described below unless they impair the function of the composition.

1.3.1. Solvent(s)

The coloring composition may contain one or more solvents (organic solvents). Examples of solvents include esters, alkylene glycol ethers, cyclic esters, nitrogen-containing solvents, alcohols, and polyhydric alcohols. Examples of nitrogen-containing solvents include cyclic amides and acyclic amides. Examples of acyclic amides include alkoxyalkylamides.

Examples of esters include glycol monoacetates, such as ethylene glycol monomethyl ether acetate, ethylene glycol monoethyl ether acetate, ethylene glycol monobutyl ether acetate, diethylene glycol monomethyl ether acetate, diethylene glycol monoethyl ether acetate, diethylene glycol monobutyl ether acetate, propylene glycol monomethyl ether acetate, dipropylene glycol monomethyl ether acetate, and methoxybutyl acetate, and glycol diesters, such as ethylene glycol diacetate, diethylene glycol diacetate, propylene glycol diacetate, dipropylene glycol diacetate, ethylene glycol acetate propionate, ethylene glycol acetate butyrate, diethylene glycol acetate butyrate, diethylene glycol acetate propionate, diethylene glycol acetate butyrate, propylene glycol acetate propionate, propylene glycol acetate butyrate, dipropylene glycol acetate butyrate, and dipropylene glycol acetate propionate.

The alkylene glycol ethers include any monoether or diether of an alkylene glycol, and alkyl ethers are preferred. Specific examples include alkylene glycol monoalkyl ethers, such as ethylene glycol monomethyl ether, ethylene glycol monoethyl ether, ethylene glycol monoisopropyl ether, ethylene glycol monobutyl ether, diethylene glycol monomethyl ether, diethylene glycol monoethyl ether, diethylene glycol monobutyl ether, triethylene glycol monomethyl ether, triethylene glycol monoethyl ether, triethylene glycol monobutyl ether, tetraethylene glycol monomethyl ether, tetraethylene glycol monoethyl ether, tetraethylene glycol monobutyl ether, propylene glycol monomethyl ether, propylene glycol monoethyl ether, propylene glycol monopropyl ether, propylene glycol monobutyl ether, dipropylene glycol monomethyl ether, dipropylene glycol monoethyl ether, dipropylene glycol monopropyl ether, dipropylene glycol monobutyl ether, and tripropylene glycol monobutyl ether, and alkylene glycol dialkyl ethers, such as ethylene glycol dimethyl ether, ethylene glycol diethyl ether, ethylene glycol dibutyl ether, diethylene glycol dimethyl ether, diethylene glycol diethyl ether, diethylene glycol dibutyl ether, diethylene glycol methyl ethyl ether, diethylene glycol methyl butyl ether, triethylene glycol dimethyl ether, triethylene glycol diethyl ether, triethylene glycol dibutyl ether, triethylene glycol methyl butyl ether, tetraethylene glycol dimethyl ether, tetraethylene glycol diethyl ether, tetraethylene glycol dibutyl ether, propylene glycol dimethyl ether, propylene glycol diethyl ether, dipropylene glycol dimethyl ether, dipropylene glycol diethyl ether, and tripropylene glycol dimethyl ether.

For these alkylene glycols, diethers are preferred to monoethers because their strong tendency to dissolve or swell resins in the ink composition helps further improve abrasion resistance.

Examples of cyclic esters include cyclic esters (lactones) such as β-propiolactone, γ-butyrolactone, δ-valerolactone, ε-caprolactone, β-butyrolactone, β-valerolactone, γ-valerolactone, β-hexanolactone, γ-hexanolactone, δ-hexanolactone, β-heptanolactone, γ-heptanolactone, δ-heptanolactone, ε-heptanolactone, γ-octanolactone, δ-octanolactone, ε-octanolactone, δ-nonalactone, ε-nonalactone, and ε-decanolactone and compounds derived from them by replacing hydrogen(s) in the methylene group adjacent to the carbonyl group with an alkyl group having one to four carbon atoms.

Examples of alkoxyalkylamides include 3-methoxy-N,N-dimethylpropionamide, 3-methoxy-N,N-diethylpropionamide, 3-methoxy-N,N-methylethylpropionamide, 3-ethoxy-N,N-dimethylpropionamide, 3-ethoxy-N,N-diethylpropionamide, 3-ethoxy-N,N-methylethylpropionamide, 3-n-butoxy-N,N-dimethylpropionamide, 3-n-butoxy-N,N-diethylpropionamide, 3-n-butoxy-N,N-methylethylpropionamide, 3-n-propoxy-N,N-dimethylpropionamide, 3-n-propoxy-N,N-diethylpropionamide, 3-n-propoxy-N,N-methylethylpropionamide, 3-isopropoxy-N,N-dimethylpropionamide, 3-isopropoxy-N,N-diethylpropionamide, 3-isopropoxy-N,N-methylethylpropionamide, 3-tert-butoxy-N,N-dimethylpropionamide, 3-tert-butoxy-N,N-diethylpropionamide, and 3-tert-butoxy-N,N-methylethylpropionamide.

Examples of cyclic amides include lactams, such as pyrrolidones including 2-pyrrolidone, 1-methyl-2-pyrrolidone, 1-ethyl-2-pyrrolidone, 1-propyl-2-pyrrolidone, and 1-butyl-2-pyrrolidone. These are preferred because they accelerate film formation by resins. In particular, 2-pyrrolidone is preferred to the others.

An example of an alcohol is a compound derived from an alkane by replacing one of its hydrogen atoms with a hydroxyl group. Preferably, the alkane has ten or fewer carbon atoms, more preferably six or fewer, even more preferably three or fewer. The number of carbon atoms in the alkane is one or more, preferably two or more. The alkane may be linear-chain or may be branched. Examples of alcohols include methanol, ethanol, n-propyl alcohol, isopropyl alcohol, n-butanol, 2-butanol, tert-butanol, isobutanol, n-pentanol, 2-pentanol, 3-pentanol, and tert-pentanol as well as phenoxyethanol, benzyl alcohol, and phenoxypropanol.

When the coloring composition contains alcohol(s), it is more preferred that the alcohol(s) be selected from aromatic monohydric alcohols and aliphatic monohydric alcohols having four or more carbon atoms. This can help improve the dispersion stability of the metal pigment. Aromatic monohydric alcohols and aliphatic monohydric alcohols having four or more carbon atoms help improve the water dispersibility of the particles with their moderate hydrophobicity and good compatibility with the surface treatment agent for the metal pigment. That is, these alcohols are able to serve the function of bridging the gap between hydrophobicity and hydrophilicity, between the hydrophobic surface of the metal pigment and the molecules of the solvent water.

For aliphatic monohydric alcohols having four or more carbon atoms, those having four to ten carbon atoms are preferred, more preferably those having four to eight carbon atoms. An aromatic monohydric alcohol is a monohydric alcohol having an aromatic ring, and examples of aromatic rings include the benzene ring and the naphthalene ring system. For the aromatic monohydric alcohols, it is preferred that the hydroxyl group be bound to an alkylene backbone moiety having one to four carbon atoms, more preferably that having one to three carbon atoms.

Preferably, the (total) amount of the aromatic monohydric alcohol(s) and/or aliphatic monohydric alcohol(s) having four or more carbon atoms is 0.5% by mass or more, more preferably 1% by mass or more, in particular 3% by mass or more of the total mass of the coloring composition. Preferably, furthermore, the amount of the aromatic monohydric alcohol(s) and/or aliphatic monohydric alcohol(s) having four or more carbon atoms is 40% by mass or less, preferably 30% by mass or less, more preferably 20% by mass or less, in particular 10% by mass or less. It is also preferred that the amount of the aromatic monohydric alcohol(s) and/or aliphatic monohydric alcohol(s) having four or more carbon atoms be in these ranges with respect to the total mass of the liquid medium component in the coloring composition.

Polyhydric alcohols are alcohols having two or more hydroxyl groups in their molecule. Polyhydric alcohols can be divided into, for example, alkanediols and polyols.

An alkanediol is, for example, a compound in which an alkane is substituted with two hydroxyl groups. Examples of alkane diols include ethylene glycol (also known as ethane-1,2-diol), propylene glycol (also known as propane-1,2-diol), 1,2-butanediol, 1,2-pentanediol, 1,2-hexanediol, 1,2-octanediol, 1,3-propanediol, 1,3-butylene glycol (also known as 1,3-butanediol), 1,4-butanediol, 2,3-butanediol, 1,2-pentanediol, 1,5-pentanediol, 2,4-pentanediol, 2-methyl-1,3-propanediol, 3-methyl-1,3-butanediol, 3-methyl-1,5-pentanediol, 2-ethyl-1,3-hexanediol, 2-methyl-1,3-pentanediol, 3-methyl-1,5-pentanediol, 2-methylpentane-2,4-diol, 1,6-hexanediol, 2-ethyl-2-methyl-1,3-propanediol, and 2-methyl-2-propyl-1,3-propanediol.

Examples of polyols include condensates in which two or more alkanediol molecules have undergone intermolecular condensation at their hydroxyl groups, and also include compounds having three or more hydroxyl groups.

Examples of condensates in which two or more alkanediol molecules have undergone intermolecular condensation at their hydroxyl groups include dialkylene glycols, such as diethylene glycol and dipropylene glycol, and trialkylene glycols, such as triethylene glycol and tripropylene glycol.

A compound having three or more hydroxyl groups is a compound having an alkane or polyether structure, for example, as its backbone and three or more hydroxyl groups on it. Examples of compounds having three or more hydroxyl groups include glycerol, trimethylolethane, trimethylolpropane, 1,2,5-hexanetriol, 1,2,6-hexanetriol, pentaerythritol, and polyoxypropylenetriol.

One of these organic solvents may be used alone, or two or more may be used in combination.

Of these organic solvents, it is particularly preferred that the coloring composition contain one or more selected from alkylene glycol ethers and cyclic esters, more preferably one or more selected from diethylene glycol diethyl ether, tetraethylene glycol monobutyl ether, and γ-butyrolactone in particular.

Preferably, the organic solvent content is 1% by mass or more, more preferably 5% by mass or more, in particular 10% by mass or more of the total mass of the coloring composition. More preferably, the organic solvent content is 20% by mass or more, even more preferably 30% by mass or more. As for the upper limit, it is preferred that the organic solvent content be 60% by mass or less, preferably 50% by mass or less, more preferably 40% by mass or less. It is also preferred that the organic solvent content be in these ranges with respect to the total mass of the liquid medium component in the coloring composition.

1.3.2. Dispersant

The coloring composition may contain a dispersant. Examples of dispersants include resin dispersants and polyoxyalkylene amine compounds. The dispersant is selected from ones with which good dispersion stability can be imparted to the metal pigment in the coloring composition.

Examples of resin dispersants include water-soluble resins, including (meth)acrylic resins and their salts, such as poly(meth)acrylic acid, (meth)acrylic acid-acrylonitrile copolymers, (meth)acrylic acid-(meth)acrylate copolymers, vinyl acetate-(meth)acrylate copolymers, vinyl acetate-(meth)acrylic acid copolymers, and vinyl naphthalene-(meth)acrylic acid copolymers; styrene resins and their salts, such as styrene-(meth)acrylic acid copolymers, styrene-(meth)acrylic acid-(meth)acrylate copolymers, styrene-α-methylstyrene-(meth)acrylic acid copolymers, styrene-α-methylstyrene-(meth)acrylic acid-(meth)acrylate copolymers, styrene-maleic acid copolymers, and styrene-maleic anhydride copolymers; urethane resins (i.e., polymeric compounds (resins) having a urethane bond, which is formed when an isocyanate group reacts with a hydroxyl group), whether linear-chain or branched and whether crosslinked or not, and their salts; polyvinyl alcohols; vinyl naphthalene-maleic acid copolymers and their salts; vinyl acetate-maleate copolymers and their salts; and vinyl acetate-crotonic acid copolymers and their salts.

Examples of polyoxyalkylene amine compounds include amine compounds having a polyoxyalkylene structure in their molecule. Examples of commercially available polyoxyalkylene amine compounds include JEFFAMINE M2070 (Huntsman) and GENAMIN (M41/2000) (Clariant).

When the coloring composition contains a dispersant, there is no particular lower limit to the dispersant content. Preferably, however, the dispersant content is 0.01% by mass or more, more preferably 0.06% by mass or more, even more preferably 0.10% by mass or more. There is no particular upper limit, too, but preferably, the dispersant content is 3.0% by mass or less, more preferably 1.0% by mass or less, even more preferably 0.5% by mass or less, in particular 0.3% by mass or less.

1.3.3. Resin(s)

The coloring composition according to this embodiment may contain resin(s). The resin(s) can be used as binder(s). Examples of resins include acrylic resins, rosin-modified resins, terpene resins, polyester resins, polyamide resins, epoxy resins, vinyl chloride resins, vinyl chloride-vinyl acetate copolymers, cellulose resins (e.g., cellulose acetate butyrate and hydroxypropyl cellulose), polyvinyl butyral, polyacrylic polyol, polyvinyl alcohol, and urethane resins. Of these, it is particularly preferred that the coloring composition contain one or more selected from acrylic resins, polyester resins, urethane resins, and cellulose resins, more preferably acrylic resin(s). An acrylic resin is a resin obtained by polymerizing at least an acrylic monomer and may be a copolymer resin formed by an acrylic monomer and an extra monomer. An example of an extra monomer is a vinyl monomer.

Preferably, the resin content is 0.01% by mass or more, more preferably 0.06% by mass or more, even more preferably 0.10% by mass or more, in particular 0.15% by mass or more of the total mass of the coloring composition for the lower limit. As for the upper limit, it is preferred that the resin content be 3.0% by mass or less, more preferably 1.0% by mass or less, even more preferably 0.5% by mass or less, in particular 0.3% by mass or less of the total mass of the coloring composition.

1.3.4. Others

The coloring composition according to this embodiment, furthermore, may contain ingredients like the following: leveling agents, polymerization accelerators, polymerization inhibitors, photopolymerization initiators, dispersants, surfactants, penetration enhancers, humectants, coloring agents, fixatives, antimolds, preservatives, antioxidants, chelating agents, thickeners, sensitizers, etc.

Examples of preferred surfactants include silicone surfactants and acetylene glycol surfactants.

1.4. Operations and Effects

In the related art, aluminum and other metal pigments have undergone surface treatment with surface treatment agents, for example to gain water resistance and leafing properties. A common type of surface treatment agent for this purpose is fluorine agents, but metal pigments treated with fluorine agents are still insufficient in terms of dispersion stability and water resistance. The metallic luster feel of the resulting recording, which relates partly to the dispersion stability and water resistance of the pigment, is also unsatisfactory. In particular, aqueous metallic compositions can produce hydrogen as a result of aqueous oxidation of the metal pigment (aluminum pigment in particular). The produced hydrogen can affect the luster feel and interferes with dispersion stability in the aqueous medium. When the metal pigment has a relatively large particle diameter, furthermore, the composition can be inferior in dispersibility because in that case precipitates of the particles that form during storage do not break back into particles. There is also a concern that regulations will be tightened, for example by treaties, to restrict the use of fluorine treatment agents.

Made with particular kind(s) of surface treatment agent(s), the coloring composition according to this embodiment is superior in dispersibility and recovery to dispersion; any precipitates that form as a result of a relatively large particle diameter of the metal pigment can be easily broken back into particles, for example by stirring or shaking the container. A metal pigment with a relatively large particle diameter, furthermore, has better water resistance and imparts a better metallic luster to the resulting colored article.

2. Pigment Dispersion

A pigment dispersion is for use in preparing the above coloring composition and contains the metal pigment described above. The pigment dispersion can be mixed with other ingredients to give the coloring composition. The metal pigment content of the pigment dispersion that has yet to be used to prepare the coloring composition, therefore, is relatively high compared with that of coloring compositions and is higher than that of the coloring composition prepared using the pigment dispersion.

A colored composition prepared using this pigment dispersion has good water resistance, and any ingredients settling down therein can be redispersed easily. The user can easily obtain a desired coloring composition by adding ingredients to the pigment dispersion, for example according to the purpose of use and intended viscosity of the coloring composition.

3. Coloring Method

A coloring method includes attaching the above coloring composition to a substrate. The substrate can be in any shape. The material for the substrate is also at the discretion of the one who carries out the method. It is not critical how the coloring composition is attached to the substrate either; the composition can be attached by, for example, brush coating, roller coating, spray coating, bar coating, or ink jet attachment. The viscosity and other characteristics of the coloring composition can be selected by changing the ingredients, their concentrations, etc., according to the attachment method.

The substrate can be anything that can be colored; not only can it be a recording medium, but also it can be a sheet-shaped material or an object in any shape.

The coloring method may include, for example, pretreatment and drying steps, in which the substrate is pretreated and dried, respectively. With this coloring method, a coating having good water resistance and good luster can be formed on a substrate.

4. Examples and Comparative Examples

Aspects of the present disclosure will now be described in further detail by providing examples. No aspect of the present disclosure, however, is limited to these examples. In the following, "%" is by mass unless stated otherwise.

4.1. Preparation of Coloring Compositions

Production of Metal Pigment Dispersions

A release resin solubilized with acetone was coated onto a 20-μm PET base sheet using a roller coater to form a release layer. The PET sheet with a release layer thereon was transferred at a rate of 5 m/s to an aluminum vacuum deposition machine, where an aluminum layer was formed to a thickness of 15 nm under reduced pressure. The resulting aluminum/release resin/PET sheet workpiece was immersed in a tetrahydrofuran bath and sonicated at 40 kHz. The aluminum pigment became detached from the PET sheet, giving a liquid containing the detached aluminum pigment. After the tetrahydrofuran was removed using a centrifuge, an appropriate amount of diethylene glycol diethyl ether was added to the solids. In this way, a suspension of aluminum particles containing 5% by mass aluminum was obtained.

The suspension of aluminum particles was stirred until the particles were crushed to their intended average diameter, giving a suspension of aluminum particles having an ink-jettable diameter (volume-average diameter D50=0.5 μm or less). In Examples 27 to 31 and Comparative Examples 9 to 12, 15, and 16, the metal pigment was crushed to the average particle diameter indicated in the tables.

In Examples 8 to 10, Jeffamine M-2070, a poly(oxyethylene/oxypropylene) amine dispersant, was added after the crushing step to make up 5% in relation to the aluminum concentration, and the resulting mixture was heated at 55° C. for 1 hour while being sonicated at 40 kHz so that aggregates would break into dispersed primary particles of aluminum. In this way, a suspension of primary particles of aluminum was obtained.

To the resulting suspension of dispersed aluminum particles, the surface treatment agent(s) indicated in Tables 1 to 8 was added. The ratio(s) by mass of the surface treatment agent(s) to the aluminum particles was as indicated in the tables.

The suspension was then heated at 55° C. for 3 hours while being sonicated at 28 kHz, giving a dispersion of a surface-treated aluminum pigment.

From the resulting aluminum pigment dispersion the solvent was removed by centrifugation, an aqueous solvent was introduced instead, and the pigment concentration was adjusted by adding ingredients according to the formula in Tables 1 to 8. In this way, coloring compositions of examples and comparative examples were prepared.

In Examples 8 to 10, the amine dispersant was added as needed to make the amine dispersant content of the composition as indicated in the table.

Separately, the solvent removed from the dispersion of a surface-treated aluminum pigment was analyzed. In all examples and comparative examples, the solvent contained no surface treatment agent. This suggests that in the examples and comparative examples in the tables, the surface treatment agent(s) was on the metal particles in the composition.

TABLE 1

| | | | | Example 1 | Example 2 | Example 3 | Example 4 | Example 5 | Example 6 | Example 7 | Comparative Example 1 | Comparative Example 2 |
|---|---|---|---|---|---|---|---|---|---|---|---|---|
| Metal pigment (aluminum particles) | | | | 1.2 | 1.2 | 1.2 | 1.2 | 1.2 | 1.2 | 1.2 | 1.2 | 1.2 |
| Surface treatment agent(s) | Phosphonic acid | Octadecyl | A = H | 0.36 | — | — | — | — | — | — | — | — |
| | | | A = COOH | — | 0.36 | — | — | — | — | — | — | — |
| | | | A = OH | — | — | 0.36 | — | — | — | — | — | — |
| | | | A = NH$_2$ | — | — | — | 0.36 | — | — | — | — | — |
| | | | A = EO | — | — | — | — | 0.36 | — | — | — | — |
| | Phosphate (monoester) | Octadecyl | A = H | — | — | — | — | — | 0.36 | — | — | — |
| | Phosphate (diester) | Octadecyl | A = H | — | — | — | — | — | — | 0.36 | — | — |
| | FHP | Perfluorohexyl | | — | — | — | — | — | — | — | 0.36 | — |
| | Silane | Silane coupling agent | | — | — | — | — | — | — | — | — | 0.36 |
| Water | | Purified water | | Balance | Balance | Balance | Balance | Balance | Balance | Balance | Balance | Balance |
| Solvents | | 1,2-Hexanediol | | 30.0 | 30.0 | 30.0 | 30.0 | 30.0 | 30.0 | 30.0 | 30.0 | 30.0 |
| | | 2-Phenoxy Ethanol | | 5.0 | 5.0 | 5.0 | 5.0 | 5.0 | 5.0 | 5.0 | 5.0 | 5.0 |
| | | Total | | 100 | 100 | 100 | 100 | 100 | 100 | 100 | 100 | 100 |

TABLE 1-continued

|  |  | Example 1 | Example 2 | Example 3 | Example 4 | Example 5 | Example 6 | Example 7 | Comparative Example 1 | Comparative Example 2 |
|---|---|---|---|---|---|---|---|---|---|---|
| Characteristics | Average particle diameter D50 [μm] | 0.47 | 0.47 | 0.47 | 0.47 | 0.47 | 0.47 | 0.47 | 0.47 | 0.47 |
| Experimental results | Water resistance | A | C | B | C | C | C | A | C | D |
|  | Dispersibility | A | C | B | B | B | B | A | D | D |
|  | Luster | A | B | B | C | B | A | B | C | D |

TABLE 2

|  |  |  |  | Example 8 | Example 9 | Example 10 | Example 11 | Example 12 | Example 13 |
|---|---|---|---|---|---|---|---|---|---|
| Metal pigment (aluminum particles) |  |  |  | 1.2 | 1.2 | 1.2 | 1.2 | 1.2 | 1.2 |
| Dispersant | Jeffamine M-2070 |  |  | 0.06 | 0.06 | 0.06 | — | — | — |
| Surface treatment agent(s) | Phosphonic acid | Octadecyl | A = H | 0.36 | — | — | — | — | — |
|  |  | Dodecyl | A = H | — | — | — | 0.36 | — | — |
|  |  | Octyl | A = H | — | — | — | — | — | — |
|  |  | Butyl | A = H | — | — | — | — | — | — |
|  | Phosphate (monoester) | Octadecyl | A = H | — | 0.36 | — | — | — | — |
|  |  | Dodecyl | A = H | — | — | — | — | 0.36 | — |
|  |  | Octyl | A = H | — | — | — | — | — | — |
|  |  | Butyl | A = H | — | — | — | — | — | — |
|  | Phosphate (diester) | Octadecyl | A = H | — | — | 0.36 | — | — | — |
|  |  | Dodecyl | A = H | — | — | — | — | — | 0.36 |
|  |  | Octyl | A = H | — | — | — | — | — | — |
|  |  | Butyl | A = H | — | — | — | — | — | — |
| Water | Purified water |  |  | Balance | Balance | Balance | Balance | Balance | Balance |
| Solvents | 1,2-Hexanediol |  |  | 30.0 | 30.0 | 30.0 | 30.0 | 30.0 | 30.0 |
|  | 2-Phenoxy Ethanol |  |  | 5.0 | 5.0 | 5.0 | 5.0 | 5.0 | 5.0 |
|  | Total |  |  | 100 | 100 | 100 | 100 | 100 | 100 |
| Characteristics | Average particle diameter D50 [μm] |  |  | 0.47 | 0.47 | 0.47 | 0.47 | 0.47 | 0.47 |
| Experimental results | Water resistance |  |  | A | B | A | A | C | B |
|  | Dispersibility |  |  | A | B | A | A | B | A |
|  | Luster |  |  | A | A | A | B | C | B |

TABLE 3

|  |  |  |  | Comparative Example 3 | Comparative Example 4 | Comparative Example 5 | Comparative Example 6 | Comparative Example 7 | Comparative Example 8 |
|---|---|---|---|---|---|---|---|---|---|
| Metal pigment (aluminum particles) |  |  |  | 1.2 | 1.2 | 1.2 | 1.2 | 1.2 | 1.2 |
| Surface treatment agent(s) | Phosphonic acid | Octadecyl | A = H | — | — | — | — | — | — |
|  |  | Dodecyl | A = H | — | — | — | — | — | — |
|  |  | Octyl | A = H | 0.36 | — | — | — | — | — |
|  |  | Butyl | A = H | — | 0.36 | — | — | — | — |
|  | Phosphate (monoester) | Octadecyl | A = H | — | — | — | — | — | — |
|  |  | Dodecyl | A = H | — | — | — | — | — | — |
|  |  | Octyl | A = H | — | — | 0.36 | — | — | — |
|  |  | Butyl | A = H | — | — | — | 0.36 | — | — |
|  | Phosphate (diester) | Octadecyl | A = H | — | — | — | — | — | — |
|  |  | Dodecyl | A = H | — | — | — | — | — | — |
|  |  | Octyl | A = H | — | — | — | — | 0.36 | — |
|  |  | Butyl | A = H | — | — | — | — | — | 0.36 |
| Water | Purified water |  |  | Balance | Balance | Balance | Balance | Balance | Balance |
| Solvents | 1,2-Hexanediol |  |  | 30.0 | 30.0 | 30.0 | 30.0 | 30.0 | 30.0 |
|  | 2-Phenoxy Ethanol |  |  | 5.0 | 5.0 | 5.0 | 5.0 | 5.0 | 5.0 |
|  | Total |  |  | 100 | 100 | 100 | 100 | 100 | 100 |
| Characteristics | Average particle diameter D50 [μm] |  |  | 0.47 | 0.47 | 0.47 | 0.47 | 0.47 | 0.47 |
| Experimental results | Water resistance |  |  | D | D | E | E | D | E |
|  | Dispersibility |  |  | C | D | D | E | D | D |
|  | Luster |  |  | C | C | D | D | C | D |

TABLE 4

|  |  |  |  | Example 14 | Example 15 | Example 16 | Example 17 | Example 18 | Example 19 | Example 20 |
|---|---|---|---|---|---|---|---|---|---|---|
| Metal pigment (aluminum particles) |  |  |  | 1.2 | 1.2 | 1.2 | 1.2 | 1.2 | 1.2 | 1.2 |
| Surface treatment agent(s) | Phosphonic acid | Octadecyl | A = H | 0.18 | 0.18 | — | — | — | — | — |
|  | Phosphate (monoester) | Octadecyl | A = H | 0.18 | — | 0.324 | 0.252 | 0.18 | 0.11 | 0.04 |
|  | Phosphate (diester) | Octadecyl | A = H | — | 0.18 | 0.036 | 0.108 | 0.18 | 0.25 | 0.32 |
| Water |  | Purified water |  | Balance | Balance | Balance | Balance | Balance | Balance | Balance |
| Solvents |  | 1,2-Hexanediol |  | 30.0 | 30.0 | 30.0 | 30.0 | 30.0 | 30.0 | 30.0 |
|  |  | 2-Phenoxy Ethanol |  | 5.0 | 5.0 | 5.0 | 5.0 | 5.0 | 5.0 | 5.0 |
|  |  | Total |  | 100 | 100 | 100 | 100 | 100 | 100 | 100 |
| Characteristics |  | Average particle diameter D50 [μm] |  | 0.47 | 0.47 | 0.47 | 0.47 | 0.47 | 0.47 | 0.47 |
| Surface treatment agents combined |  |  |  | 0.36 | 0.36 | 0.36 | 0.36 | 0.36 | 0.36 | 0.36 |
| Ratio of surface treatment agents by mass (%), diester/(monoester + diester) |  |  |  | — | 50 | 10 | 30 | 50 | 69 | 89 |
| Experimental results |  | Water resistance |  | B | A | B | B | B | A | A |
|  |  | Dispersibility |  | A | A | B | B | A | A | A |
|  |  | Luster |  | A | A | A | B | B | B | B |

TABLE 5

|  |  |  |  | Example 21 | Example 22 | Example 23 | Example 24 | Example 25 | Example 26 |
|---|---|---|---|---|---|---|---|---|---|
| Metal pigment (aluminum particles) |  |  |  | 1.2 | 1.2 | 1.2 | 1.2 | 1.2 | 1.2 |
| Surface treatment agent(s) | Phosphonic acid | Octadecyl | A = H | 0.05 | — | — | 0.5 | — | — |
|  | Phosphate (monoester) | Octadecyl | A = H | — | 0.05 | — | — | 0.5 | — |
|  | Phosphate (diester) | Octadecyl | A = H | — | — | 0.05 | — | — | 0.5 |
| Water |  | Purified water |  | Balance | Balance | Balance | Balance | Balance | Balance |
| Solvents |  | 1,2-Hexanediol |  | 30.0 | 30.0 | 30.0 | 30.0 | 30.0 | 30.0 |
|  |  | 2-Phenoxy Ethanol |  | 5.0 | 5.0 | 5.0 | 5.0 | 5.0 | 5.0 |
|  |  | Total |  | 100 | 100 | 100 | 100 | 100 | 100 |
| Characteristics |  | Average particle diameter D50 [μm] |  | 0.47 | 0.47 | 0.47 | 0.47 | 0.47 | 0.47 |
| Surface treatment agents combined |  |  |  | 0.05 | 0.05 | 0.05 | 0.5 | 0.5 | 0.5 |
| Ratio of surface treatment agents by mass (%), diester/(monoester + diester) |  |  |  | 0 | 0 | 100 | 0 | 0 | 100 |
| Experimental results |  | Water resistance |  | C | C | C | A | B | A |
|  |  | Dispersibility |  | C | C | C | C | C | C |
|  |  | Luster |  | C | D | D | D | E | D |

TABLE 6

|  |  |  |  | Example 27 | Example 28 | Example 29 | Example 30 | Example 31 |
|---|---|---|---|---|---|---|---|---|
| Metal pigment (aluminum particles) |  |  |  | 1.2 | 1.2 | 1.2 | 1.2 | 1.2 |
| Surface treatment agent(s) | Phosphonic acid | Octadecyl | A = H | 0.36 | — | — | — | — |
|  | Phosphate (monoester) | Octadecyl | A = H | — | — | 0.36 | 0.36 | 0.36 |
|  | Phosphate (diester) | Octadecyl | A = H | — | 0.36 | — | — | — |
|  | FHP | Perfluorohexyl |  | — | — | — | — | — |
|  | Silane | Silane coupling agent |  | — | — | — | — | — |
| Water |  | Purified water |  | Balance | Balance | Balance | Balance | Balance |
| Solvents |  | 1,2-Hexanediol |  | 30.0 | 30.0 | 30.0 | 30.0 | 30.0 |
|  |  | 2-Phenoxy Ethanol |  | 5.0 | 5.0 | 5.0 | 5.0 | 5.0 |
|  |  | Total |  | 100 | 100 | 100 | 100 | 100 |
| Characteristics |  | Average particle diameter D50 [μm] |  | 7.0 | 7.0 | 7.0 | 3.0 | 9.0 |

TABLE 6-continued

|  |  | Example 27 | Example 28 | Example 29 | Example 30 | Example 31 |
|---|---|---|---|---|---|---|
| Experimental results | Water resistance | A | A | A | B | A |
|  | Dispersibility | A | B | B | B | C |
|  | Luster | A | A | A | A | A |

TABLE 7

|  |  |  |  | Comparative Example 15 | Comparative Example 16 | Comparative Example 9 | Comparative Example 10 | Comparative Example 11 | Comparative Example 12 |
|---|---|---|---|---|---|---|---|---|---|
| Metal pigment (aluminum particles) |  |  |  | 1.2 | 1.2 | 1.2 | 1.2 | 1.2 | 1.2 |
| Surface treatment agent(s) | Phosphonic acid | Octadecyl | A = H | 0.36 | — | — | — | — | — |
|  | Phosphate (monoester) | Octadecyl | A = H | — | — | — | — | — | — |
|  | Phosphate (diester) | Octadecyl | A = H | — | 0.36 | — | — | — | — |
|  | FHP | Perfluorohexyl |  | — | — | 0.36 | — | 0.36 | — |
|  | Silane | Silane coupling agent |  | — | — | — | 0.36 | — | 0.36 |
| Water |  | Purified water |  | Balance | Balance | Balance | Balance | Balance | Balance |
| Solvents |  | 1,2-Hexanediol |  | 30.0 | 30.0 | 30.0 | 30.0 | 30.0 | 30.0 |
|  |  | 2-Phenoxy Ethanol |  | 5.0 | 5.0 | 5.0 | 5.0 | 5.0 | 5.0 |
|  |  | Total |  | 100 | 100 | 100 | 100 | 100 | 100 |
| Characteristics |  | Average particle diameter D50 [μm] |  | 10.0 | 10.0 | 10.0 | 10.0 | 7.0 | 7.0 |
| Experimental results |  | Water resistance |  | B | B | C | C | D | D |
|  |  | Dispersibility |  | D | D | D | D | D | D |
|  |  | Luster |  | B | B | C | C | C | C |

TABLE 8

|  |  |  |  | Example 32 | Example 33 | Example 34 |
|---|---|---|---|---|---|---|
| Metal pigment (aluminum particles) |  |  |  | 1.2 | 1.2 | 1.2 |
| Surface treatment agent(s) | Phosphonic acid | Octadecyl | A = H | 0.36 | 0.36 | 0.36 |
|  | Phosphate (monoester) | Octadecyl | A = H | — | — | — |
|  | Phosphate (diester) | Octadecyl | A = H | — | — | — |
| Water |  | Purified water |  | Balance | Balance | Balance |
| Solvents |  | 1,2-Hexanediol |  | 30.0 | 30.0 | 30.0 |
|  |  | 2-Phenoxy Ethanol |  | — | — | 2.0 |
|  |  | 1-Butanol |  | 5.0 | — | — |
|  |  | Total |  | 100 | 100 | 100 |
| Characteristics |  | Average particle diameter D50 [μm] |  | 0.47 | 0.47 | 0.47 |
| Experimental results |  | Water resistance |  | A | B | A |
|  |  | Dispersibility |  | B | C | B |
|  |  | Luster |  | A | C | B |

The source and other details of the ingredients in the tables are as follows.

Octadecyl (A=H) phosphonic acid (Tokyo Chemical Industry)

Octadecyl (A=COOH) phosphonic acid: A terminal COOH group was introduced into octadecylphosphonic acid.

Octadecyl (A=OH) phosphonic acid: A terminal OH group was introduced into octadecylphosphonic acid.

Octadecyl (A=NH$_2$) phosphonic acid: A terminal NH$_2$ group was introduced into octadecylphosphonic acid.

Octadecyl (A=EO) phosphonic acid: A was a 2-[2-(2-methoxyethoxy)ethoxy]ethoxy group; A terminal 2-[2-(2-methoxyethoxy)ethoxy]ethoxy group was introduced into octadecylphosphonic acid.

Monooctadecyl phosphate (Johoku Chemical)

Dioctadecyl phosphate (Johoku Chemical)

FHP: 2-(Perfluorohexyl)ethylphosphonic acid

Octadecyltrimethoxysilane (Tokyo Chemical Industry)

Dodecyl (A=H) phosphonic acid (Tokyo Chemical Industry)

Octyl (A=H) phosphonic acid (Tokyo Chemical Industry)

Butyl (A=H) phosphonic acid (Tokyo Chemical Industry)

A silane coupling agent: Octadecyltrimethoxysilane (Tokyo Chemical Industry)

4.2. Evaluations
4.2.1. Water Resistance

In each example or comparative example, the coloring composition was sealed in a packet, and this packet was left in a temperature-controlled chamber at 70° C. for 6 days. Gas production per unit mass of the composition was determined, and water resistance was graded according to the criteria below. The smaller the gas production is, the better the composition is in water resistance. Grades A to C were considered good levels.

Grading Criteria
- A: The gas production is less than 0.2 ml/g
- B: The gas production is 0.2 ml/g or more and less than 0.4 ml/g
- C: The gas production is 0.4 ml/g or more and less than 1.0 ml/g
- D: The gas production is 1.0 ml/g or more and less than 5.0 ml/g
- E: The gas production is 5.0 ml/g or more 4.2.2. Dispersibility For each example and each comparative example, a 20 kHz-sonicated, diethylene glycol diethyl ether-containing 5% by mass metal pigment suspension obtained during the production of the aqueous composition was sampled. The metal particles in this sample were dispersed with ESLEAM AD-374M (NOF), a dispersant that exhibits good dispersibility in nonaqueous media, and the resulting dispersion was analyzed using Microtrac MT-3300 (MicrotracBEL, a laser diffraction/scattering particle size distribution analyzer) for the volume-average diameter D50 of the metal particles contained therein. The volume-average diameter D50 of the metal particles contained in this dispersion was used as the reference value.

A 100-ml aliquot of the finished aqueous composition of the example or comparative example was sealed tightly in a glass container, and this glass container was left at room temperature for a month. Then the container was shaken ten times, and the volume-average diameter D50 of the metal particles in the composition was measured. The measured D50 was compared with the reference value, and the dispersibility of the metal particles was graded according to the criteria below. The smaller the percentage of the volume-average diameter D50 of the metal particles in the aqueous composition to the reference value is, the better the composition is in the dispersibility (redispersibility) of the metal particles. Grades A to C were considered good levels. The reference value was assumed to be 100%. In the examples and comparative examples in which the average diameter of the metal particles was 3 μm or more, precipitates of the metal particles were observed after the 1-month storage.
- A: The percentage of the D50 of the metal particles in the aqueous composition to the reference value is less than 110%.
- B: The percentage of the D50 of the metal particles in the aqueous composition to the reference value is 110% or more and less than 150%.
- C: The percentage of the D50 of the metal particles in the aqueous composition to the reference value is 150% or more and less than 200%.
- D: The percentage of the D50 of the metal particles in the aqueous composition to the reference value is 200% or more and less than 500%.
- E: The percentage of the D50 of the metal particles in the aqueous composition to the reference value is 500% or more 4.2.3. Luster For each example or comparative example, a recording was produced using a modified version of Seiko Epson's SC-S80650. The nozzle density of the nozzle rows of the ink jet head was 360 npi, or 360 nozzles per inch. The ink jet head was filled with the coloring composition of the example or comparative example. The waveform for driving the ink jet head was optimized for the best ejection. The recording medium was a polyvinyl chloride film (Mactac; Mactac 5829R). In the recording job, the attachment density of the ink in the recorded pattern was 5 mg/inch$^2$, and the recording resolution was 1440×1440 dpi. In Examples 27 to 31 and Comparative Examples 9 to 12, 15, and 16, the composition was attached to reach the same density using a bar coater instead. These examples and comparative examples are suitable for use as paints.

The printed area of the recording for the example or comparative example was analyzed using MINOLTA MULTI GLOSS 268 gloss meter for gloss at a measuring angle of 60°, and luster was graded according to the criteria below. The greater the measured gloss is, the better the recording is in luster. Grades A to C were considered good levels.
- A: The gloss is 400 or more
- B: The gloss is 350 or more and less than 400
- C: The gloss is 300 or more and less than 350
- D: The gloss is 250 or more and less than 300
- E: The gloss is less than 250

4.3. Evaluation Results

In Table 1, the impact of whether the functional group was an alkylphosphonic acid or phosphoric acid or another and that of the kind of the terminal group were examined. In Tables 2 and 3, the impact of the length of the carbon chain bound to the alkylphosphonic acid or phosphoric acid was examined. In Tables 4 and 5, the impact of changing the proportions and amounts of a monoester and a diester of an alkylphosphoric acid was examined. In Tables 6 and 7, the impact of the particle diameter was examined. In Table 8, the impact of the formula of the composition was examined.

The aqueous coloring compositions in the examples, containing water and a metal pigment that was metal particles having a surface treated with at least one surface treatment agent being a compound represented by general formula (1) or (2), with the volume-average diameter D50 of the metal particles 9 μm or less, were all found to be good at water resistance. Any ingredients settling down therein, furthermore, could be redispersed easily.

Examples 27 to 31 demonstrate coloring compositions made with a metal pigment that was metal particles having a surface treated with a surface treatment agent according to an embodiment were superior in dispersibility and redispersibility when the volume-average diameter of the metal particles was 9 μm or less.

Comparative Examples 15 and 16 demonstrate a volume-average diameter of the metal particles exceeding 9 μm caused the metal particles to settle down easily. Even through the surface treatment agent was an appropriate one, the metal particles that settled down could not be redispersed; the compositions were inferior in redispersibility.

Comparative Examples 1, 2, 11, and 12 demonstrate coloring compositions made with a metal pigment that was metal particles having a surface treated with a surface treatment agent not according to an embodiment were inferior in dispersibility and in dispersibility or redispersibility, despite the fact that the volume-average diameter of the metal particles was smaller than 9 μm.

The foregoing embodiments and variations are merely examples; no aspect of the present disclosure is limited to them. For example, the embodiments and variations can be combined as needed.

The present disclosure embraces configurations substantially identical to those described in the embodiments, such as configurations identical in function, methodology, and results to or having the same goal and offering the same advantages as the described ones. The present disclosure also includes configurations created by changing any non-essential part of those described in the embodiments. The present disclosure, furthermore, encompasses configurations identical in operation and effect to or capable of fulfilling the same purposes as those described in the embodiments. Configurations obtained by adding a known technology to those described in the embodiments are also part of the present disclosure.

From the embodiments and variations described above, the following is derived.

An aqueous coloring composition contains:
a metal pigment and water, wherein:
the metal pigment is metal particles having a surface treated with at least one surface treatment agent;
the surface treatment agent is at least one compound represented by general formula (1) or (2); and
the volume-average particle diameter D50 of the metal pigment is 9 μm or less:

$$(A^1\text{-}R^1\text{---})P(O)(OH)_2 \quad (1)$$

$$(A^2\text{-}R^2\text{---}O\text{---})_a P(O)(OH)_{3-a} \quad (2)$$

where $A^1$ and $A^2$ each independently represent a hydrogen atom or a group selected from a carboxyl group, a hydroxyl group, an amino group, and an oxyalkylene-containing group, $R^1$ and $R^2$ each independently represent a hydrocarbon group having 12 or more carbon atoms, and $a$ represents an integer of 1 or 2.

This coloring composition achieves good water resistance. Any ingredients setting down therein, furthermore, can be redispersed easily.

For the above coloring composition,
the surface treatment agent may include either a compound represented by formula (1) or a compound represented by formula (2) in which $a$ is represented by 2.

This coloring composition achieves better water resistance. Any ingredients setting down therein, furthermore, can be redispersed easily.

For the above coloring composition,
the percentage of compounds represented by formula (1) in which $a$ is 2 may be 5% by mass or more and 90% by mass or less, with the total mass of the surface treatment agent being 100% by mass.

This coloring composition achieves better water resistance. Any ingredients setting down therein, furthermore, can be redispersed easily.

For the above coloring composition,
the volume-average particle diameter D50 of the metal pigment may be 3 μm or more and 8 μm or less.

This coloring composition achieves good water resistance. The metallic luster is better by virtue of the large particle diameter. Although ingredients easily settle down because of the large particle diameter, furthermore, such ingredients can be redispersed easily.

For the above coloring composition,
the volume-average particle diameter D50 of the metal pigment may be 1 μm or less.

This coloring composition achieves good water resistance, despite the large specific surface area of the metal pigment. Any ingredients setting down therein, furthermore, can be redispersed easily.

For the above coloring composition,
the $R^1$ or $R^2$, for the surface treatment agent, may be a hydrocarbon group having 15 or more and 30 or fewer carbon atoms.

This coloring composition achieves good dispersion stability and good water resistance. Any ingredients setting down therein, furthermore, can be redispersed easily.

For the above coloring composition,
the coloring composition may be a paint composition.

This coloring composition helps provide a paint composition having good water resistance and good redispersibility.

For the above coloring composition,
the metal particles may be particles of aluminum or an aluminum alloy.

With this coloring composition, a coating having a better metallic luster can be formed.

For the above coloring composition,
the amount of the surface treatment agent may be 1% by mass or more and 50% by mass or less, with the total mass of the metal particles being 100% by mass.

This coloring composition achieves better water resistance. Any ingredients settling down therein, furthermore, can be redispersed more easily.

For the above coloring composition,
the metal particles may be shaped like flakes.

With this coloring composition, a coating having a better metallic luster can be formed.

For the above coloring composition,
the coloring composition may further contain an organic solvent.

This coloring composition achieves better dispersion stability.

For the above coloring composition,
the organic solvent may be selected from aromatic monohydric alcohols and aliphatic monohydric alcohols having four or more carbon atoms.

This ensures better dispersion stability of the coloring composition.

A coloring method includes:
attaching any of the above coloring compositions to a substrate.

With this coloring method, a coating having good water resistance and good luster can be formed.

A pigment dispersion is:
a pigment dispersion for use in preparing any of the above coloring compositions and contains the metal pigment.

With this pigment dispersion, a coloring composition having good water resistance can be prepared. Any ingredients settling down in the resulting composition, furthermore, will be easy to redisperse.

What is claimed is:
1. An aqueous coloring composition comprising:
a metal pigment, an organic solvent, and water, wherein:
the metal pigment is metal particles having a surface treated with at least one surface treatment agent;
the metal particles are particles formed of aluminum or an aluminum alloy;
the organic solvent contains an aromatic monohydric alcohol:
the surface treatment agent is at least one compound represented by general formula (1) or (2); and a volume-average particle diameter D50 of the metal pigment is 9 μm or less:

(1)

(2)

where $A^1$ and $A^2$ each independently represent a hydrogen atom or a group selected from a carboxyl group, a hydroxyl group, an amino group, and an oxyalkylene-containing group, $R^1$ and $R^2$ each independently represent a hydrocarbon group having 12 or more carbon atoms, and a represents an integer of 1 or 2.

2. The coloring composition according to claim 1, wherein:
the surface treatment agent includes either a compound represented by formula (1) or a compound represented by formula (2) in which a is represented by 2.

3. The coloring composition according to claim 1, wherein:
a percentage of compounds represented by formula (1) in which a is 2 is 5% by mass or more and 90% by mass or less, with a total mass of the surface treatment agent being 100% by mass.

4. The coloring composition according to claim 1, wherein:
the volume-average particle diameter D50 of the metal pigment is 3 μm or more and 8 μm or less.

5. The coloring composition according to claim 1, wherein:
the volume-average particle diameter D50 of the metal pigment is 1 μm or less.

6. The coloring composition according to claim 1, wherein:
for the surface treatment agent, the $R^1$ or $R^2$ is a hydrocarbon group having 15 or more and 30 or fewer carbon atoms.

7. The coloring composition according to claim 1, wherein:
the coloring composition is a paint composition.

8. The coloring composition according to claim 1, wherein:
the metal particles are particles of aluminum-Hey.

9. The coloring composition according to claim 1, wherein:
an amount of the surface treatment agent is 1% by mass or more and 50% by mass or less, with a total mass of the metal particles being 100% by mass.

10. The coloring composition according to claim 1, wherein:
the metal particles are shaped like flakes.

11. The coloring composition according to claim 1, wherein an amount of the organic solvent is 1% to 60% by mass of the total mass of the coloring composition.

12. The coloring composition according to claim 11, wherein an amount of the aromatic monohydric alcohol is 0.5% to 40% by mass of the total mass of the coloring composition.

13. A coloring method comprising:
attaching the coloring composition according to claim 1 to a substrate.

14. A pigment dispersion for use in preparing the coloring composition according to claim 1, the pigment dispersion comprising:
the metal pigment.

* * * * *